(12) United States Patent
Shimbo (10) Patent No.: US 6,778,940 B2
(45) Date of Patent: Aug. 17, 2004

(54) ESTIMATION OF THE CONFIGURATION OF AN OPTICAL ELEMENT FOR AN OPTICAL WRITING DEVICE

(75) Inventor: Kohei Shimbo, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/358,151

(22) Filed: Feb. 5, 2003

(65) Prior Publication Data

US 2003/0120454 A1 Jun. 26, 2003

Related U.S. Application Data

(62) Division of application No. 09/845,274, filed on May 1, 2001, now Pat. No. 6,546,357.

(30) Foreign Application Priority Data

May 1, 2000 (JP) .......................................... 2000-132571
Feb. 23, 2001 (JP) .......................................... 2001-047726

(51) Int. Cl.[7] .............................................. G01B 11/24
(52) U.S. Cl. ....................................... 702/167; 702/127
(58) Field of Search ................................ 73/1.79, 1.81; 216/26; 264/2.7; 356/237.1, 237.2, 239.1, 239.2, 239.7, 398, 600, 601, 609, 624, 2; 359/642, 838, 871; 425/808; 451/42; 700/159, 197, 198; 702/127, 155, 166, 167

(56) References Cited

U.S. PATENT DOCUMENTS

| 4,537,732 A | * | 8/1985 | Ueda et al. ................... 264/1.1 |
| 4,781,452 A | * | 11/1988 | Ace ............................ 351/177 |
| 5,435,818 A | * | 7/1995 | Mashige et al. ............ 65/29.12 |
| 5,549,855 A | * | 8/1996 | Nakanishi et al. ........... 264/2.5 |
| 5,604,549 A | * | 2/1997 | Mashige et al. ............. 351/177 |
| 5,828,500 A | * | 10/1998 | Kida et al. ................... 359/798 |
| 6,091,532 A | * | 7/2000 | Nakanishi et al. ........... 359/205 |

FOREIGN PATENT DOCUMENTS

| JP | 10-068676 | * | 10/1998 | .......... G01M/11/02 |
| JP | 2001-194266 | * | 7/2001 | .......... G01M/11/00 |

* cited by examiner

Primary Examiner—John Barlow
Assistant Examiner—Douglas N Washburn
(74) Attorney, Agent, or Firm—Oblon, Spivak, McClelland, Maier & Neustadt, P.C.

(57) ABSTRACT

A method and an device for estimating the configuration of an optical element for an optical writing device are disclosed. The optical characteristics of the optical element are estimated on the basis of configuration data derived from actual measurement. The estimated optical characteristics are used to estimate the performance of the optical element. The optical element has a sufficiently small curve on the image surface of the writing device ascribable to the shift of focal point.

24 Claims, 4 Drawing Sheets

ESTIMATION OF THE CONFIGURATION OF AN OPTICAL ELEMENT FOR AN OPTICAL WRITING DEVICE

BACKGROUND OF THE INVENTION

The present invention relates to a method of estimating the configuration of an optical element for use in an optical writing device included in an image forming apparatus, an optical element, and a method of producing the same Generally, a digital copier, laser printer or similar image forming apparatus includes an optical writing device that includes scanning optics. Today, it is a common practice with the scanning optics to use an aspherical lens represented by:

$$x(h) = \frac{Ch^2}{1 + \sqrt{1 - (1+k)C^2h^2}} + \sum e_i h^i \qquad \text{Eq. (1)}$$

where h denotes a lens height, C denotes a paraxial curvature, k denotes a conic constant, and $e_i$ denotes the coefficient of a polynomial.

An aspherical lens is mainly implemented as a plastic lens produced by injection molding.

To meet the increasing demand for high image quality and low cost scanning optics, it is necessary to reduce the number of optical elements constituting the scanning optics. This can be done with, e.g., a toric surface that is aspherical in the main scanning direction, but has a curvature varying in accordance with the main scanning direction. A lens with a toric surface is expressed as:

$$z(x, y) = \frac{Cx^2}{1 + \sqrt{1 - (1+k)C^2x^2}} + \sum_{j=0}^{m}\sum_{i=0}^{n} e_{ji} x^i y^j \qquad \text{Eq. (2)}$$

where x denotes coordinates in the main scanning direction, y denotes coordinates in the subscanning direction, z denotes coordinates in the direction of an optical axis, c denotes a curvature in the main scanning direction, k denotes a conic constant, and $e_{ji}$ denotes the coefficient of a polynomial.

An ultraprecision, free curved surface machining apparatus has made it possible to implement the optical function surface of a lens as a toric surface with a high degree of freedom.

Each optical function surface of a lens or optical element included in the scanning optics usually has an effective range extending over several ten millimeters to several hundred millimeters in the main scanning direction, but only over several ten millimeters in the subscanning direction. When such a lens is produced by, e.g., plastic injection molding, a deviation from a designed value (configuration error hereinafter) occurs due to, e.g., the uneven contraction of resin.

Resins in general have a contraction ratio of about 0.7%. To fabricate a specular surface frame for injection molding in accordance with the designed configuration of an optical function surface, it has been customary to implement a configuration enlarged by similar enlargement using a contraction ratio that is determined either by theory or by experience. However, because an optical function surface is as great as several hundred millimeters, the nonlinear contraction of resin introduces a configuration error of several micrometers to several ten of micrometers in the optical function surface, noticeably affecting the performance of the optics. In this respect, the estimation of the configuration error of a lens is essential. It is a common practice to measure the contour configuration of a molding in a plane that passes the design original in the mains scanning direction (generator) by use of a contour measuring device and then estimate a configuration error in accordance with the measured contour configuration. Typical of the contour measuring device is FORM TALYSURF available from Rank Taylor.

Japanese Patent Laid-Open Publication Nos. 6-129944 and 7-35541 each disclose a specific estimation method for determining whether or not a configuration error is sufficiently small. One of conventional estimation methods optimizes the paraxial curvature radius of an aspherical equation in such a manner as to minimize the square sum of a configuration error (best fit R hereinafter). Another conventional method uses as an estimation parameter a difference between the best fit R and an aspherical equation, i.e., a configuration error. However, as the amount of asphyericality, i.e., a deviation from a designed spherical surface increases, the correlation between the belt fit R or the parameter for estimation and the optical performance decreases. Consequently, when a tolerance is distributed in order to prevent performance from being rejected by, e.g., optical simulation, some lenses may be rejected by configuration estimation, but may be allowed as to optical characteristic.

Japanese Patent Laid-Open Publication No. 9-89713, for example, proposes an estimation method using a parameter more closely correlated to optical characteristics than the above-discussed parameters. This estimation method produces the second-order derivative of a configuration error or a quadratic differential based on a difference between adjoining coordinates data or a difference between the derivative and the differential. The method then confines the second-order derivative, the quadratic differential or the difference in a particular range so as to guarantee lens performance. The above document, however, simply teaches that the estimation method implements a closer correlation than the other conventional methods by presenting actual specific moldings. How the above method is effective for lens surfaces other than the actual moldings is not known.

On the other hand, Japanese Patent Laid-Open Publication Nos. 5-96572 and 7-60857 each propose to reduce the configuration error of a molding by measuring the configuration of the molding to thereby determine a configuration error and then correcting a specular surface frame in such a manner as to cancel the configuration error This, however, requires a specular surface frame matching with all optical function surfaces to be corrected until the configuration error becomes sufficiently small.

Japanese Patent Laid-Open Publication Nos. 10-288749 and 11-77842 address to a refractive index distribution particular to a plastic lens produced by injection molding. Specifically, a non-uniform refractive index distribution in resin derives a lens effect and causes the focal point of optics to vary. To solve this problem, it is necessary to revise design or to execute an extra step for the reduction of the refractive index distribution after molding. Even if all optical elements are configured as designed, an optical scanning device including the optical elements cannot achieve expected optical performance unless the refractive index distribution is reduced to zero. This is because the shift of the focal point causes an image surface to curve. Particularly, assume that a spot diameter on an image surface is reduced to implement high density, scanning optics. Then, the F number of the optics must be reduced because the spot diameter is substantially proportional to the F number. This, however, causes the focal depth to decrease in proportion to the square of the spot diameter. Therefore, the prerequisite with the development of such scanning optics is that the curve of the image surface ascribable to the shift of a focal point in the image surface be sufficiently small.

SUMMARY OF THE INVENTION

It is therefore a first object of the present invention to provide a configuration estimating method capable of estimating the optical characteristics of a lens on the basis of the result of measurement and estimating the performance of the lens on the basis of the estimated characteristics and therefore adaptive to any desired lens surface and closely correlated to the optical characteristics, and a device for practicing the same.

It is a second object of the present invention to provide a method of producing an optical element capable of sufficiently reducing the curve of an image surface ascribable to the shift of a focal point on the image surface and producing such an optical element in a short period of time at low cost.

In accordance with the present invention, a method of estimating the surface configuration of a lens begins with a step of measuring the contour configuration of the lens. The configuration error of the lens that is a deviation from a designed configuration is determined. Subsequently, a partial curvature at each lens height is determined on the basis of the configuration error. Thereafter, a curvature proportional coefficient, which is a shift of a focal point for a unit curvature at each lens height, as measured in the direction of an optical axis on an image surface, is determined. Finally, the shift is estimated on the basis of the curvature proportional coefficient and partial curvature.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
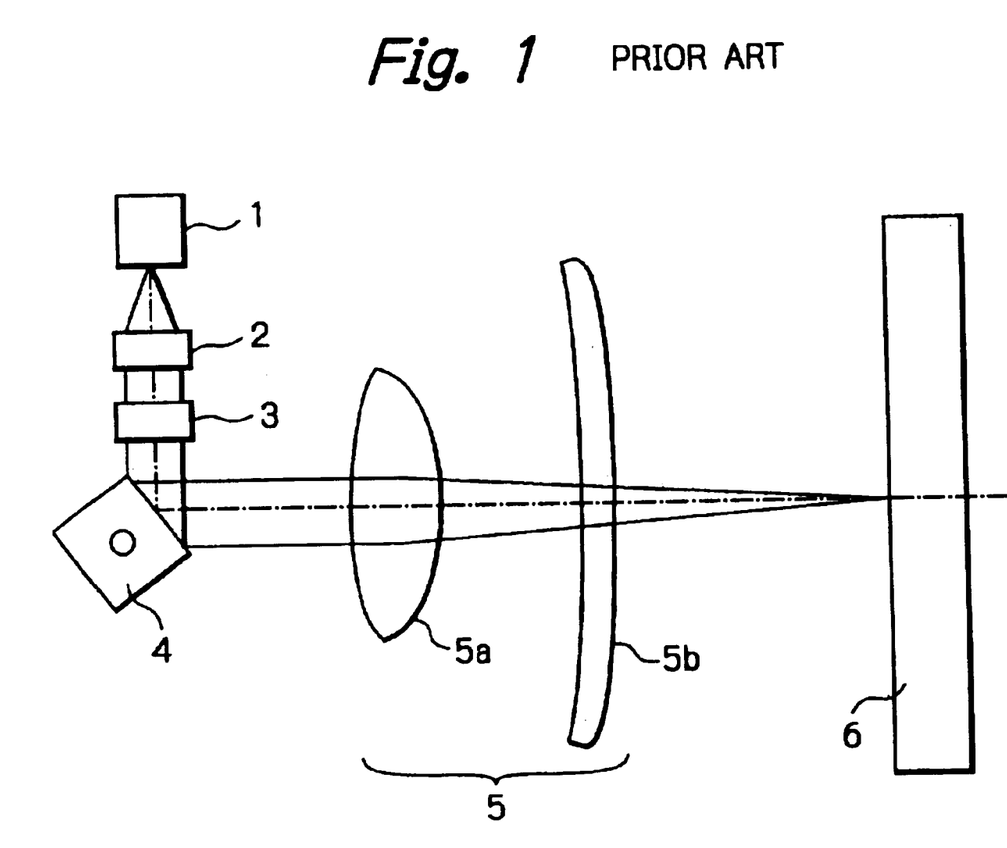
FIG. 1 is a view showing an optical writing unit included in an image forming apparatus and to which the present invention is applicable.

Referring to FIG. 1 of the drawings, an optical writing device to which the present invention is applied is shown. As shown, the optical writing device includes a semiconductor laser or similar light source 1. A luminous flux issuing from the light source 1 is transmitted through a collimator lens 2 to become a parallel flux. The parallel flux is then converged by a cylindrical lens 3 onto the reflection face of a polygonal mirror 4 in the form of a line. The polygonal mirror 4 in rotation deflects the incident flux toward an image surface 6 via scanning optics 5. A photoconductive element, not shown, has its surface positioned at the image surface 6.

Assume that the direction in which the polygonal mirror 4 deflects the luminous flux is a main scanning direction, and that the direction perpendicular to the main scanning direction is a subscanning direction. Further, assume that a position on each optical function surface in the main scanning direction is a lens height, and that a position on the image surface 6 in the main scanning direction is an image height.

Preferred embodiments of the present invention will be described hereinafter with reference to the accompanying drawings.

First Embodiment

Generally, when the configuration of a lens is close to a designed configuration, the shift of a focal point on an image surface in the direction of optical axis is substantially proportional to the partial curvature of the configuration error of a lens surface at each lens height. By using this relation, the illustrative embodiment measures the contour configuration of a subject lens, determines a deviation of the measured configuration from a designed configuration, then determines a partial curvature of the deviation, then estimates the shift of a focal point at any desired lens height, and then evaluates the lens.

First, assume that all lenses have ideal configurations. Then, at a given time when a luminous flux passes through part of the effective range of a given lens at a particular position of the lens in accordance with the rotation angle of a polygon motor, the flux is focused on a fixed position adjoining an image surface. This may be interpreted to mean that optical elements are independent of each other at a given time. More specifically, it is possible to determine, e.g., the focal distance of the individual optical element. In addition, because the individual lens has a smoothly contiguous surface, the focal distance and other optical characteristics are considered to be also smoothly contiguous. Although each lens may have an ideal configuration, the focal point at a given time is, in a strict sense, shifted from the image surface, as will be discussed specifically later. At this stage of description, consideration is given to a shift from a focal point to occur in the ideal condition when a subtle configuration error is introduced in a lens having an ideal configuration.

Second, assume that a lens to be estimated involves a configuration error. A configuration error is sufficiently small at any time with respect to a designed configuration. Therefore, assume that the influence of the configuration error in a luminous flux on optical characteristics at any time lies in a range that can be approximated by the paraxial theory. Today, the shift of a focal point ascribable to a configuration error is a decisive factor that effects yield. The shift of a focal point is ascribable to variation in partial curvature, as confirmed by optical simulations. In light of this, the illustrative embodiment estimates the shift of a focal point on the image surface ascribable to variation in partial curvature.

The influence of a configuration error on the front and rear of a given lens will be described by using Snell laws. A Snell's equation in an ideal condition is:

$$\frac{n'}{s'_d} = \frac{n}{s} + (n' - n)C_d \qquad \text{Eq. (3)}$$

where s denotes an imaging position at the object side, $s_d'$ denotes an imaging position at the image side, n denotes a refractive index at the object side, and $C_d$ denotes the curvature of a lens surface.

Figure 2:
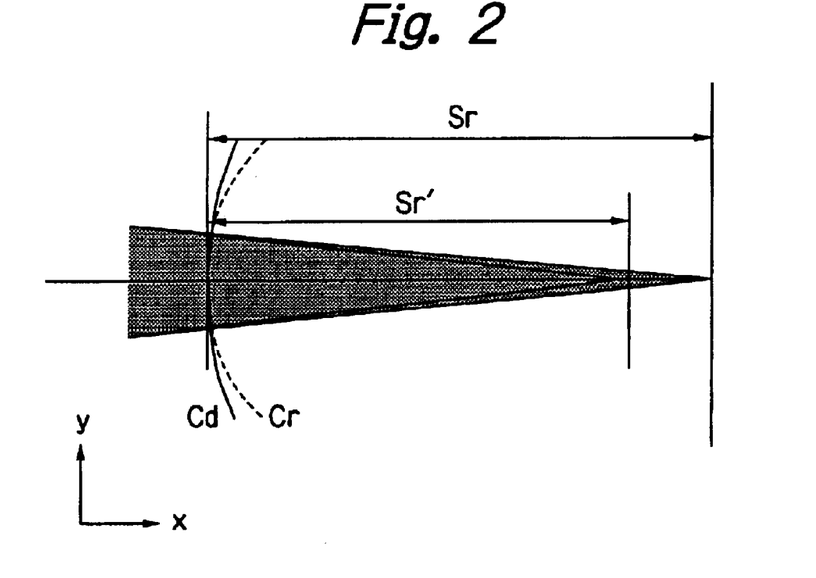
FIG. 2 is a view showing optics adjoining a luminous flux corresponding to the rotation angle of a polygon motor.

As shown in FIG. 2, assume that the curvature $C_d$ is varied to $C_r$ by a configuration error. Then, the resulting focal point $s_r'$ at the image side is expressed as:

$$\frac{n'}{s'_r} = \frac{n}{s} + (n' - n)C_r \qquad \text{Eq. (4)}$$

The shift $\Delta_s'$ of the focal point at the image side is produced by:

$$\Delta s' = s'_r - s'_d = -s'_r s'_d \frac{n'-n}{n'}(C_r - C_d) \qquad \text{Eq. (5)}$$
$$\approx -s'^2_d \frac{n'-n}{n'} \Delta C$$

Because a curvature error $\Delta C$ is sufficiently smaller than the designed curvature $C_d$, the shift of the focal point $\Delta_s'$ is smaller than the focal distance s' and approximately expressed as:

$$S_r' \approx S_d' \qquad \text{Eq. (6)}$$

So long as lenses following the above lens surface have designed values, a magnification is constant, so that the shift of the focal point on the image surface is proportional to the curvature error. In this case, a proportional coefficient is a constant dependent on the designed configuration.

Figure 3:
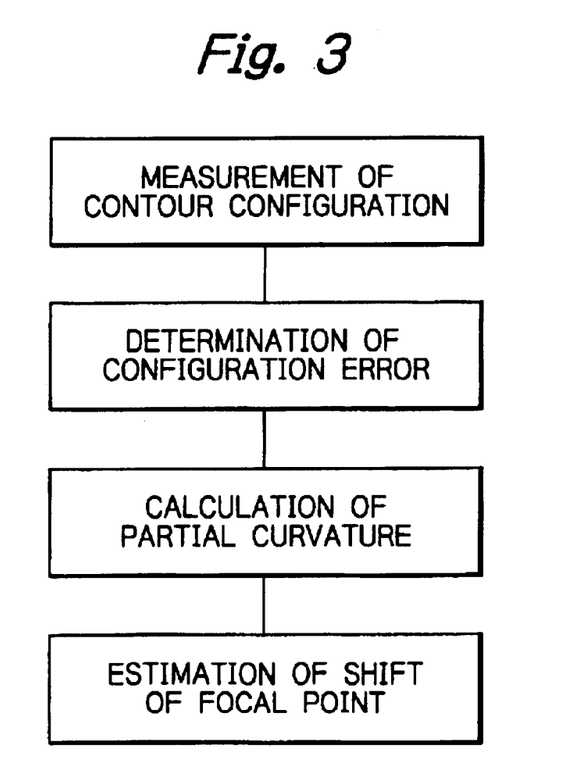
FIG. 3 is a flowchart demonstrating a specific procedure for estimating the shift of a focal point unique to a first embodiment of the present invention.

It is therefore possible to estimate the shift of a focal point of a given lens on the image surface by producing a proportional coefficient, which is the shift of a focal point on the image surface for a unit curvature at any lens height, and a curvature error at any lens height. FIG. 3 demonstrates a procedure for dealing with measured data.

The result of measurement is output in the form of dot-sequential data. That is, each dot is output as coordinates data in a coordinates system that is dependent on a measuring apparatus. To separate a designed configuration component from the measured data, the coordinates system used for measurement and the coordinates system used for design must be identical. In practice, however, such two systems cannot be identical due to, e.g., the accuracy of mounting of a subject lens. Coordinates conversion is therefore necessary for representing the dot sequence of the coordinate system used for measurement by the coordinates system used for design. Because a matrix for coordinates conversion cannot be directly produced, the coordinates system used for measurement is replaced with a coordinates system whose error is smallest. This can be done by optimizing the above matrix in such a manner as to minimize the configuration error. As for bidimensional data, among three degrees of freedom, i.e., a shift sx in the direction of optical axis, a shift sy in the direction perpendicular to the direction of optical axis and a rotation angle θ, at least sy and θ are optimized. In practice, to correct the mounting error, tridimensional optimization may be effected by using the square sum of the configuration error after coordinates conversion as an estimation function.

A partial curvature is produced from the configuration error, as follows. First, the configuration error data is divided into a plurality of dot sequences. Each divided dot sequence has a length in the y axis direction that should preferably be close to the width of the luminous flux. Subsequently, the divided dot sequences each are approximated to a spherical surface by a minimum square scheme in order to determine the curvature of the spherical surface. For the approximation, use is made of an equation representative of a spherical surface:

$$x - x0 = \frac{C(y-y0)^2}{1 + \sqrt{1 - C^2(y-y0)^2}} \qquad \text{Eq. (7)}$$

where (x0, y0) denotes the coordinates of the apex of the spherical surface, and c denotes the curvature of the spherical surface. In practice, the curvature c of the spherical surface is produced by optimizing such parameters by use of the minimum square scheme.

Another specific method of producing a partial curvature from the configuration error is as follows. First, the configuration error data are divided into a plurality of dot sequences. Again, each divided dot sequence has a length in the y axis direction that should preferably be close to the width of the luminous flux. Subsequently, the divided dot sequences each are approximated to a quadratic polynomial by the minimum square scheme. The square term of the quadratic polynomial is doubled to produce a curvature. In practice, use is made of a singular value resolving method or similar linear minimum square method.

Still another specific method of producing a partial curvature from the configuration error is as follows. First, the configuration error data are approximated to a polynomial (8), which is shown below, having a suitable degree so as to produce the coefficients of the individual terms. Subsequently, the coefficients of a second-order derivative (9), which is also shown below, of the approximated polynomial are produced.

$$f(y) = \sum_{i=0}^{n} e_i y^i \qquad \text{Eq. (8)}$$

$$f''(y) = \sum_{i=2}^{n} i(i-1)e_i y^{i-2} \qquad \text{Eq. (9)}$$

The above operation is repeated with a plurality of lens heights.

A specific method of estimating the shift of a focal point will be described hereinafter. For preparation, the sample configuration error of a suitable model equation is added to the designed value of a particular lens surface. Optical simulation is then effected by using a plurality of deflector angles. Subsequently, a lens height of a point where a chief ray derived from each deflector angle and the lens surface meet each other, as measured in the main scanning direction, and a shift from the designed focal point on the image surface are produced. Also, the partial curvature of a polynomial configuration error at each lens height is determined by the previously stated method. The shift of the focal point at each lens height is divided by the partial curvature to thereby produce a partial curvature proportional coefficient, which is the shift of the focal point for a unit curvature. Thereafter, the relation between the lens height and the partial curvature proportional coefficient is approximated to a suitable function, e.g., a polynomial. By storing the parameter of the polynomial, it is possible to determine the proportional coefficient of a shift at any lens height.

Figure 4:
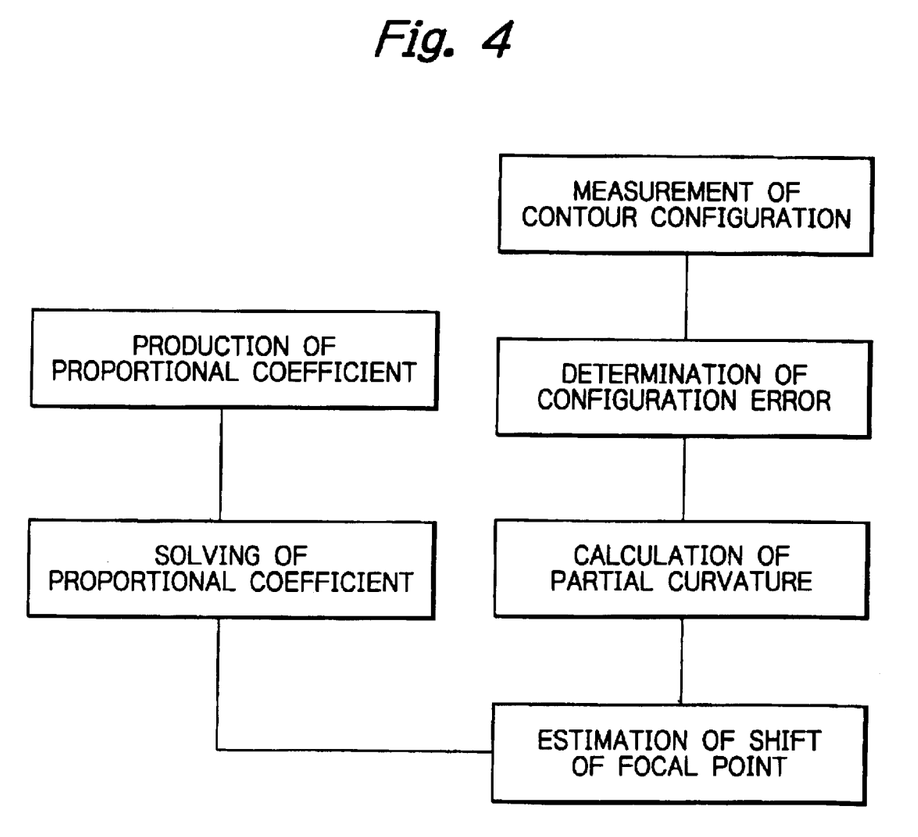
FIG. 4 is a flowchart demonstrating another specific procedure for estimating the shift of a focal point available with the first embodiment of the present invention.

To estimate the shift of a focal point, a partial curvature and a proportional coefficient are produced at each of a plurality of lens heights from the results of measurement of actual samples and then added. FIG. 4 demonstrates the procedure for dealing with measured data.

Another specific method of estimating the shift of a focal point is as follows. Again, for preparation, the sample configuration error of a suitable model equation is added to the designed value of a particular lens surface. Optical simulation is then effected by using a plurality of deflector angles. Subsequently, there are produced a lens height at a point where a chief ray derived from each deflector angle and the lens surface meet each other, as measured in the main scanning direction, an image height on the image surface and a shift from the designed focal point on the image surface. Also, the partial curvature of a polynomial configuration error at each lens height is determined by the previously stated method. Subsequently, the relation between the lens height and the image height is approximated to a model equation, e.g., a polynomial, and a parameter thereof is preserved. Further, the shift of focal point at each lens height is divided by the partial curvature in order to produce a proportional coefficient, which is the shift of a focal point for a unit curvature. Such proportional coefficients are approximated to a suitable function, e.g., a polynomial, and a parameter thereof is preserved. This allows the proportional coefficient of the shift of a focal point at any lens height to be produced. Thereafter, the product of the image height and partial curvature and the proportional coefficient is produced at each of a plurality of lens heights from the result of actual measurement, thereby determining a relation between the image height and the shift of focal point.

When the sample configuration error is spherical and has a certain curvature, the partial curvature of the configuration error at any lens height is identical. In this case, a partial curvature does not have to be produced. That is, the shift of the focal point is divided by a curvature or constant to thereby produce a partial curvature.

When the sample configuration error is parabolic, the partial curvature is constant at all lens heights if use is made of the previously stated method that produces a second-order derivative. It is therefore not necessary to determine the partial curvature of the sample configuration error as when the sample configuration error is spherical.

Assume that the shift of the focal point is estimated in terms of the relation between the image height in the image surface and the shift. Then, the influence of the first surface and that of the second surface of a lens are estimated as image surface curves, which are the shifts of the focal point in a single image surface. By adding the image surface curvatures, it is possible to estimate the shift of the focal point of a single lens.

If a personal computer, for example, capable of executing the above procedure is connected to the measuring apparatus, then the procedure can be implemented by software on the personal computer.

As stated above, the illustrative embodiment has various unprecedented advantages, as enumerated below.

(1) A shift of the focal point can be estimated from a configuration error, so that a lens can be evaluated on the basis of the shift. Consequently, the result of configuration evaluation and the optical performance of a lens are more closely correlated to each other. This increases yield, allows the tolerances of various parameters for machining to be increased, and reduces the production cost of lenses.

(2) Errors unavoidable when a subject lens is mounted to a jig can be corrected to promote evaluation with high repeatability.

(3) Measurement data derived from a contour configuration are divided into partial data each having a length substantially equal to the diameter of a luminous flux. A curvature is then determined with each of the partial data. It is therefore possible to more accurately estimate a configuration as to a local configuration error existing in part of a lens surface.

(4) Approximation to a quadratic polynomial is more stable and implements estimation in a shorter time than approximation to a spherical surface.

(5) A polynomial promotes more stable configuration estimation by reducing the influence of, e.g., fine dust present on the surface of a subject lens during measurement. Dust and other deposits present on a lens would cause coordinates to locally vary to a noticeable degree.

(6) The proportional coefficient of a shift of the focal point on an image surface for a unit curvature is determined by optical simulations beforehand. A relation between the proportional coefficient and the lens height can be approximated to a suitable function and stored. This allows a proportional coefficient to be easily produced for any desired lens height and therefore realizes rapid estimation.

(7) A relation between the image height on the image surface and a shift of the focal point is finally obtained. By comparing such a relation with the result of measurement effected with an actual lens, it is possible to examine the accuracy of estimation and to correct the proportional coefficient.

(8) Because sample configuration errors are implemented by a spherical surface, a procedure for estimating the curvatures of a sample configuration is simplified.

(9) Because sample configuration errors are implemented by a parabolic surface, a procedure for estimating the curvatures of a sample configuration is simplified. Further, while the quadratic term of a polynomial is included in the non-spherical coefficients of an optical simulator, it is, in many cases, not used and allows a numerical value to be input. This makes it needless to modify a simulator or needs a minimum of modification.

(10) By adding a shift of the focal point of the first surface and that of the second surface of a lens, it is possible to estimate the total accuracy of the lens. For example, even a lens whose individual surface does not satisfy a tolerance, but satisfies it as to total accuracy, can be adequately estimated. This increases yield.

(11) A configuration estimating device with a close correlation to optical characteristics is achievable.

Second Embodiment

Figure 5:
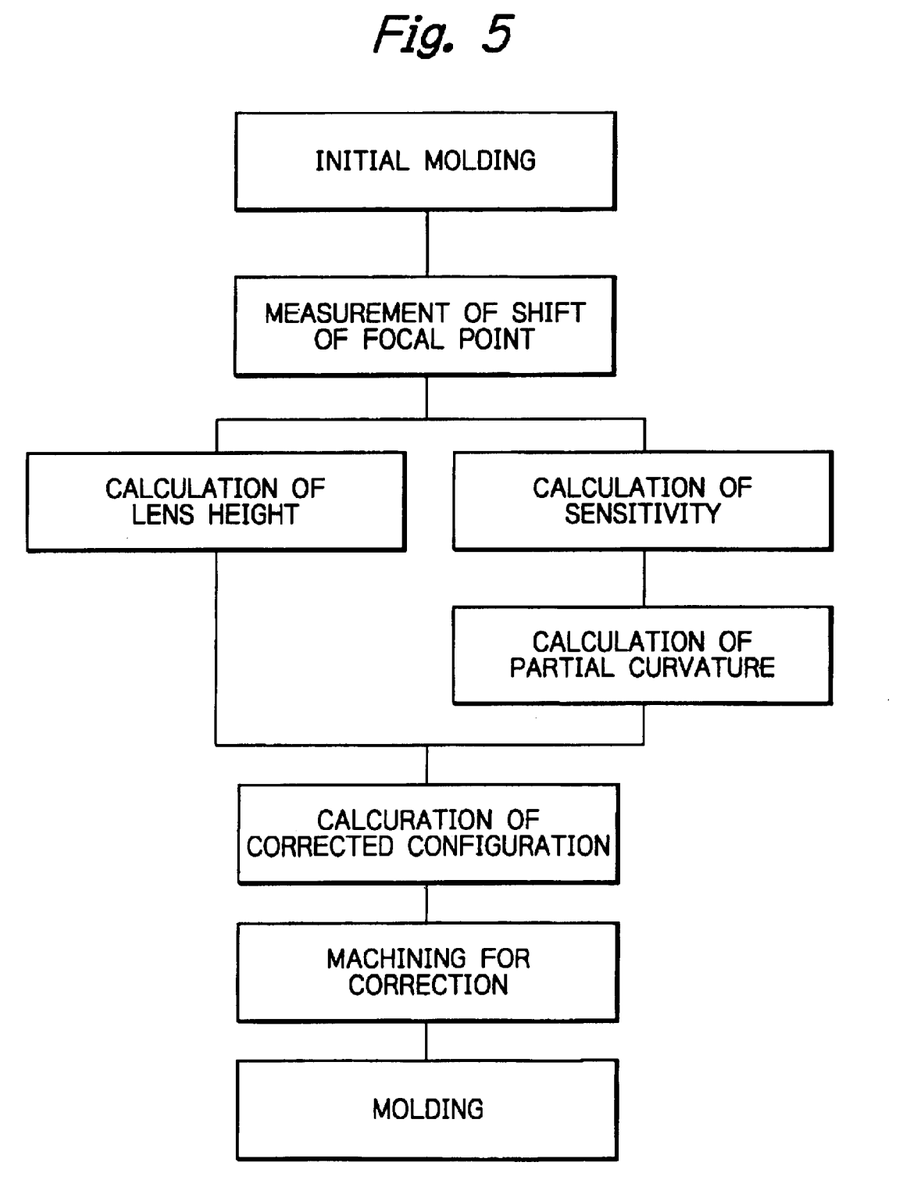
FIG. 5 is a flowchart showing a specific procedure for reducing the curve of an image surface unique to a second embodiment of the present invention.

This embodiment executes the procedure of the previous embodiment in the reverse way. Briefly, the illustrative embodiment measures shifts of the focal point at different image heights, generates, based on the measured shifts, a corrected configuration for canceling the shift in a particular optical function surface, and correcting a specular surface frame for molding to thereby reduce the field curvature of the entire optics. The illustrative embodiment will be described specifically with reference to FIG. 5.

Initial Molding

First, a mold is produced by a conventional method and used to produce optical elements by injection molding. At this instant, molding conditions are accurately examined to stably produce optical elements in the same configuration.

Measurement of Shift of Focal Point

The optical elements are built in an optical scanning device in order to measure shifts of the focal point. Specifically, the polygonal mirror is fixed in place while a device for measuring a beam to issue from a laser is mounted on, e.g., a direct-acting stage. The stage is moved in the direction of optical axis in order to measure the spot diameter of a luminous flux. The above device measures the beam profile of a luminous flux incident to a particular surface and outputs, e.g., spot diameters in the main and subscanning directions. This produces deviations from the image surface at various image heights and the distributions of spot diameters in the main and subscanning directions. These factors are approximated to, e.g., a quadratic function to thereby produce minimum values, each of which is representative of a shift of the focal point at a particular image height. Consequently, there are produced an image height distribution and shift distributions in the main and subscanning directions.

Calculation of Lens Height

Lens heights corresponding to the image heights, which are used to determine the shifts of the focal point, are calculated on a particular optical function surface. Specifically, a distribution of image heights and that of lens heights are determined by simulations beforehand. Such distributions are approximated to a function, and the coefficient of the function is stored. The function is then solved to determine lens heights.

Calculation of Sensitivity

There are calculated, on a particular optical function surface, the sensitivity of partial curvatures corresponding to the image heights from which the shifts of the focal point are produced. Specifically, a distribution of image heights and that of sensitivity of partial curvatures are determined by simulation beforehand. More specifically, the following procedure is executed by varying the deflection angle while giving a configuration error only to a particular surface. An image height at which the chief ray of the luminous flux is incident to the image surface is determined. Configuration errors in a range which the chief ray passes through a particular optical function surface are approximated to a spherical surface or a quadratic curve, thereby determined a partial curvature selected. Spot diameters in the main and subscanning directions are produced at a plurality of positions close to the image surface. Such factors each are approximated to, e.g., a particular quadratic function to thereby determine a minimum value, which is representative of a shift of the focal point. The shifts in the main and subscanning directions each are divided by associated one of the partial curvatures for thereby determining sensitivity, which is a shift of the focal point for a unit partial curvature. The sensitivity is approximated to a function, and the coefficient of the function is stored. In practice, the individual function is solved.

Calculation of Partial Curvature

The sensitivity and the shift of the focal point are used to produce a corrected partial curvature that cancels the shift of the focal point of the entire optics in a particular optical function surface. A corrected partial curvature dC is produced by:

$$dC = -\frac{d}{k} \qquad \text{Eq. (10)}$$

where d and k denote a shift of the focal point and sensitivity, respectively.

Calculation of Corrected Configuration

Finally, lens heights in one or both of the main and subscanning directions and the distribution of corrected partial curvatures are used to calculate a corrected configuration in the particular optical function surface. For this purpose, the coefficient of a model equation representative of a curved surface is determined, or alternatively map data in the optical function surface are generated. A corrected configuration is output such that a height at any position can be calculated for producing NC (Numerical Control) data.

A specific method of producing a corrected configuration is as follows. A surface on which a partial curvature in the subscanning direction varies in the main scanning direction is produced by:

$$C_s = f(x) \qquad \text{Eq. (11)}$$

$$z(x, y) = \frac{C_s y^2}{1 + \sqrt{1 - C_s^2 y^2}} \qquad \text{Eq. (12)}$$

It follows that if the partial curvature distribution in the subscanning direction can be approximated to a function f(x), then a corrected configuration in the subscanning direction can be directly produced. As for the function, use should preferably be made of a polynomial or a spline.

Another specific method of producing a corrected configuration is as follows. Generally, when a partial curvature is small, it is substantially equal to the two-step partial differential of a configuration. By using this fact, the specific method to be described integrates the partial curvature distribution for thereby producing a corrected configuration. Specifically assume that the function model of a corrected configuration to be produced is the following n×2 degree polynomial:

$$z(x, y) = \sum_{j=0}^{2} \sum_{i=0}^{n} e_{ji} x^i y^j \qquad \text{Eq. (13)}$$

Two-step partial differential is expressed as:

$$\frac{\partial^2 z}{\partial x^2} = \sum_{j=0}^{2} \sum_{i=2}^{n} i(i-1) e_{ji} x^{i-2} y^j \qquad \text{Eq. (14)}$$

$$\frac{\partial^2 z}{\partial y^2} = \sum_{j=2}^{2} \sum_{i=2}^{n} j(j-1) e_{ji} x^i y^{j-2} = \sum_{i=0}^{n} 2 e_{2i} x^i \qquad \text{Eq. (15)}$$

It is therefore possible to produce a corrected configuration by producing $e_{ij}$ from partial curvatures in the main and subscanning directions. As for the subscanning direction, the lens height distribution and partial curvature distribution are approximated to n-degree polynomials, and the coefficients of the polynomials each are multiplied by 0.5 to thereby produce respective $e_{2i}$. As for the main scanning direction, the lens height distribution and partial curvature distribution each are approximated to an n−2-degree polynomial and then integrated two times to thereby produce respective $e_{0i}$. Assume that NC data for machining a specular surface frame for correction should be generated. Then, the above procedure allows a height at any desired height to be produced and therefore allows a corrected configuration in a particular optical function surface that cancels the configuration errors of the entire optics to be produced.

A further specific method of producing a corrected configuration is as follows. This method calculates a corrected configuration on the basis of the partial curvature distribution in the main scanning direction. First, the lens height distribution and partial curvature distribution each are numerically integrated two times, thereby producing a lens height distribution and a corrected configuration distribution. Such distributions each are approximated to a suitable function model. This allows any desired function model other than a spline, trigonometric function or similar polynomial model included in design equations to be used.

Because a corrected configuration is produced by integration, the influence of, e.g., focal point measurement errors often accumulate. In light of this, when the entire corrected configuration has an excessively great size, it is preferable to correct low-degree coefficients, which influence partial curvature little, for thereby reducing the absolute value of the corrected configuration.

Machining for Correction

The corrected configuration produced by the procedure described above is superposed on a designed configuration so as to produce a new configuration of the optical function surface. The specular surface frame of a mold is produced on the basis of the new configuration. Assume that use is made of a free curved surface machining apparatus for producing an absolute configuration by, e.g., cutting or grinding. Then, after the corrected configuration has been superposed on the designed configuration, NC data for machining a specular surface frame by a conventional method and used for machining. On the other hand, assume that use is made of a grinding machine capable of removing a work by a specified relative amount, the corrected configuration is directly subjected to similar transformation and plus-minus inversion in the direction of height to thereby generate NC data for machining.

Molding

Finally, injection molding is effected in the same conditions as the initial molding. As a result, despite that all the optical function surfaces of an optical element are deviated from designed configurations, the shift of focal point of the optical element, except for a scatter component, is substantially zero when the element is mounted to an optical scanning device.

The illustrative embodiment will be described more specifically hereinafter.

(1) The above-described procedure cannot reduce the shift of the focal point to zero when executed only once because of the machining errors of a specular surface frame and errors ascribable to molding. In light of this, the measurement of a shift stated earlier is executed with the produced optical element to see if it satisfies target performance required of an optical scanning device. If the performance of the optical element is short of the target performance, then the procedure is repeated until the former reached the latter.

(2) A particular optical function surface should preferably be a surface whose sensitivity is generally low in both of the main and subscanning directions. This is because the corrected configuration of such a surface is large sized and therefore little susceptible to the influence of the absolute accuracy of a machining apparatus. In many cases, scanning optics does not include an optical function surface whose sensitivity is low in both of main and subscanning directions. In such a case, a particular surface in each of the main and subscanning directions, i.e., two surfaces should preferably be corrected.

Further, when it is desired to correct only one specular surface frame, at least one surface in the scanning optics may be made flat. Particularly, it is preferable to additionally design a parallel flat sheet and mold an optical element therewith by injection molding. To prevent the sensitivity of the resulting molding from increasing in sensitivity in the main and subscanning directions, the molding should preferably be positioned close to the image surface. In this condition, a corrected configuration is produced in accordance with the above flat surface, and then the specular surface frame thereof is machined for correction. Machining a flat surface for correction by several micrometers to several ten micrometers is easier and more accurate than machining an optical function surface, which is curved. Moreover, use can be made of a machining apparatus with a small stroke that is far lower in cost than an ultraprecision, free curved surface machining apparatus. In this manner, only if the substantially flat specular surface is corrected for a single optical function surface, the shift of focal point of a scanning device can be more accurately corrected.

(3) The procedure beginning with the calculation of lens heights and ending with the calculation of a corrected configuration can be implemented by, e.g., software installed in a personal computer. It is therefore possible to produce software that sequentially executes the procedure shown and described and outputting NC data for correction by inputting measured shifts of focal point.

As described above, the illustrative embodiment achieves various unprecedented advantages, as enumerated below.

(1) When plastic optical elements unique to the illustrative embodiment are built in an optical scanning device, the shift of the focal point except for scatter is reduced to substantially zero. The scanning device therefore achieves high performance. In addition, machining for correction is effected on the basis of the shifts of the focal point of the scanning device actually measured, the influence of a refractive index distribution is corrected at the same time. It follows that a refractive index distribution, which may be left in the optical elements, does not effect the performance of the scanning device.

(2) Shifts of the focal point are actually measured and then corrected by use of optical function surfaces that have margins as to machining accuracy. Therefore, even if the machining accuracy available is short of accuracy required of a particular optical function surface of the optics, optical elements particularly feasible for a scanning device whose beam diameter is small can be produced. This is desirable from the industrial application standpoint.

(3) The total accuracy of a lens is estimated as well before the correction of a specular surface frame. Therefore, even if a single surface of a lens does not satisfy a tolerance, it can be so corrected to satisfy the tolerance as to total accuracy and therefore achieves high accuracy.

(4) Optical elements for an optical scanning device that achieve target performance can be produced.

(5) The procedure ends in a short time because optical simulation does not have to be conducted each time.

(6) The configuration of an optical function surface that cancels the shift of the focal point of optics is attainable without resorting to additional optical simulations or the additional design of optical function surfaces.

(7) NC data is attainable in a short period because only part of the coefficients of design equations should be changed for the calculation of a corrected configuration and the generation of NC data.

(8) The curve of an image surface can be corrected without resorting to an ultraprecision, free curved surface machining device having a sufficient operation range. This successfully reduces the machining cost of a specular surface frame.

(9) NC data for correction machining can be almost automatically produced from data representative of measured shifts of the focal point. This reduces designer's errors and allows correction to be completed in a short period.

Various modifications will become possible for those skilled in the art after receiving the teachings of the present disclosure without departing from the scope thereof.

What is claimed is:

1. A method of producing an optical element by molding, comprising:
   a shift measuring step of mounting the optical element molded by injection molding to an optical scanning device, which is equivalent to an optical scanning device to be actually used, and measuring shifts of a focal point in a direction of optical axis at a plurality of image heights on an image surface;
   a lens height calculating step of calculating positions on a particular optical function surface that correspond one-to-one to the plurality of image heights;
   a sensitivity calculating step of calculating sensitivity in terms of proportional coefficients of partial curvatures and shifts of the focal point on the particular optical function surface that correspond one-to-one to the plurality of image heights;
   a partial curvature calculating step of calculating partial curvatures on the particular optical function by using the shifts of the focal point and the sensitivity;
   a corrected configuration calculating step of outputting, based on the lens heights and the partial curvatures, a corrected configuration of the particular function surface in a form of coefficients of a function model or map data;
   a correction machining step of machining for correction a specular surface frame of a mold corresponding to the particular optical function surface; and
   a molding step of molding the optical element by using the specular surface frame corrected.

2. The method as claimed in claim 1, further comprising a step of executing said shift measuring step by using the optical element corrected and repeating, if said optical element does not have a target configuration, said lens height calculating step through said molding step.

3. The method as claimed in claim 2, wherein said lens height calculating step comprises determining by an optical simulation lens heights in a main scanning direction, at each of which a chief ray deflected by a particular angle is incident to a particular optical function surface, and image heights in said main scanning direction at each of which said chief ray is incident to an image surface, approximating a lens height distribution and an image height distribution to a polynomial or similar model while storing a coefficient of said polynomial, and solving said polynomial to thereby produce lens heights each corresponding to a particular image height input.

4. The method as claimed in claim 3, wherein said corrected configuration calculating step comprises approximating the lens height distribution and a partial curvature distribution in a subscanning direction to a function model while storing a coefficient of said function model, solving said function model at a plurality of points on the particular optical function surface from positions in the main scanning direction to thereby produce partial curvatures, and solving an arc function including said partial curvatures from positions in the subscanning direction to thereby produce heights.

5. The method as claimed in claim 4, wherein said corrected configuration calculating step comprises:
   a modeling step of approximating the lens height distribution and the partial curvature distribution in the main scanning-direction to a function model while storing a coefficient of said function model, and integrating said function model two times while storing a coefficient of an integrated function model; and
   a configuration calculating step of solving the function model at a plurality of positions of the particular optical function surface from positions in the main scanning direction to thereby produce heights.

6. The method as claimed in claim 2, wherein said sensitivity calculating step comprises superposing configuration errors only on the particular optical function surface by a simulation, determining, at a plurality of deflection angles, image heights, shifts of the focal point in the direction of an optical axis, and partial curvatures in a portion of said particular optical function surface through which a luminous flux passes, dividing said shifts of a focal point by said partial curvatures to thereby determine sensitivity of said shifts for a unit curvature, approximating an image height distribution and a sensitivity distribution to a polynomial or similar function model while storing a coefficient of said polynomial, and solving said polynomial to thereby produce sensitivity corresponding to an image height input.

7. The method as claimed in claim 2, wherein said corrected configuration calculating step comprises approximating a lens height distribution and a partial curvature distribution in a subscanning direction to a polynomial:

$$C_s = \sum_{i=0}^{n} C_{si} x^i$$

and using a coefficient $C_{si}$ of said polynomial to solve an equation:

$$z(x, y) = \sum_{i=0}^{n} \frac{C_{si}}{2} x^i y^2$$

for thereby calculating a corrected configuration at any desired point.

8. The method as claimed in claim 2, wherein said corrected configuration calculating step comprises:
   a modeling step of executing numerical integration with a lens height distribution and a partial curvature distribution in a main scanning direction two times, and approximating results of said numerical integration to a function model while storing a coefficient of said function model; and
   a configuration calculating step of solving said function model at a plurality of points on the particular optical function surface from positions in the main scanning direction to thereby produce heights.

9. The method as claimed in claim 1, wherein said lens height calculating step comprises determining by an optical simulation lens heights in a main scanning direction, at each of which a chief ray deflected by a particular angle is incident to a particular optical function surface, and image heights in said main scanning direction at each of which said chief ray is incident to an image surface, approximating a lens height distribution and an image height distribution to a polynomial or similar model while storing a coefficient of said polynomial, and solving said polynomial to thereby produce lens heights each corresponding to a particular image height input.

10. The method as claimed in claim 9, wherein said sensitivity calculating step comprises superposing configuration errors only on the particular optical function surface by a simulation, determining, at a plurality of deflection angles, image heights, shifts of the focal point in the direction of an optical axis, and partial curvatures in a portion of said particular optical function surface through which a luminous flux passes, dividing said shifts of a focal point by said partial curvatures to thereby determine sensitivity of said shifts for a unit curvature, approximating an image height distribution and a sensitivity distribution to a polynomial or similar function model while storing a coefficient of said polynomial, and solving said polynomial to thereby produce sensitivity corresponding to an image height input.

11. The method as claimed in claim 1, wherein said corrected configuration calculating step comprises approximating the lens height distribution and a partial curvature distribution in a subscanning direction to a function model while storing a coefficient of said function model, solving said function model at a plurality of points on the particular optical function surface from positions in the main scanning direction to thereby produce partial curvatures, and solving an arc function including said partial curvatures from positions in the subscanning direction to thereby produce heights.

12. The method as claimed in claim 1, wherein said corrected configuration calculating step comprises approximating a lens height distribution and a partial curvature distribution in a subscanning direction to a polynomial:

$$C_s = \sum_{i=0}^{n} C_{si} x^i$$

and using a coefficient $C_{si}$ of said polynomial to solve an equation:

$$z(x, y) = \sum_{i=0}^{n} \frac{C_{si}}{2} x^i y^2$$

for thereby calculating a corrected configuration at any desired point.

13. The method as claimed in claim 1, wherein said corrected configuration calculating step comprises:
a modeling step of approximating the lens height distribution and the partial curvature distribution in the main scanning direction to a function model while storing a coefficient of said function model, and integrating said function model two times while storing a coefficient of an integrated function model; and
a configuration calculating step of solving the function model at a plurality of positions of the particular optical function surface from positions in the main scanning direction to thereby produce heights.

14. The method as claimed in claim 1, wherein said corrected configuration calculating step comprises:
a modeling step of executing numerical integration with a lens height distribution and a partial curvature distribution in a main scanning direction two times, and approximating results of said numerical integration to a function model while storing a coefficient of said function model; and
a configuration calculating step of solving said function model at a plurality of points on the particular optical function surface from positions in the main scanning direction to thereby produce heights.

15. The method as claimed in claim 1, wherein said sensitivity calculating step comprises superposing configuration errors only on the particular optical function surface by a simulation, determining, at a plurality of deflection angles, image heights, shifts of the focal point in the direction of an optical axis, and partial curvatures in a portion of said particular optical function surface through which a luminous flux passes, dividing said shifts of a focal point by said partial curvatures to thereby determine sensitivity of said shifts for a unit curvature, approximating an image height distribution and a sensitivity distribution to a polynomial or similar function model while storing a coefficient of said polynomial, and solving said polynomial to thereby produce sensitivity corresponding to an image height input.

16. The method as claimed in claim 15, wherein said corrected configuration calculating step comprises approximating the lens height distribution and a partial curvature distribution in a subscanning direction to a function model while storing a coefficient of said function model, solving said function model at a plurality of points on the particular optical function surface from positions in the main scanning direction to thereby produce partial curvatures, and solving an arc function including said partial curvatures from positions in the subscanning direction to thereby produce heights.

17. The method as claimed in claim 15, wherein said corrected configuration calculating step comprises approximating a lens height distribution and a partial curvature distribution in a subscanning direction to a polynomial:

$$C_s = \sum_{i=0}^{n} C_{si} x^i$$

and using a coefficient $C_{si}$ of said polynomial to solve an equation:

$$z(x, y) = \sum_{i=0}^{n} \frac{C_{si}}{2} x^i y^2$$

for thereby calculating a corrected configuration at any desired point.

18. The method as claimed in claim 15, wherein said corrected configuration calculating step comprises:
a modeling step of approximating the lens height distribution and the partial curvature distribution in the main scanning direction to a function model while storing a coefficient of said function model, and integrating said function model two times while storing a coefficient of an integrated function model; and
a configuration calculating step of solving the function model at a plurality of positions of the particular optical function surface from positions in the main scanning direction to thereby produce heights.

19. The method as claimed in claim 15, wherein said corrected configuration calculating step comprises:
a modeling step of executing numerical integration with a lens height distribution and a partial curvature distribution in a main scanning direction two times, and approximating results of said numerical integration to a function model while storing a coefficient of said function model; and
a configuration calculating step of solving said function model at a plurality of points on the particular optical function surface from positions in the main scanning direction to thereby produce heights.

20. The method as claimed in claim 1, wherein said corrected configuration calculating step comprises approximating the lens height distribution and a partial curvature distribution in a subscanning direction to a function model while storing a coefficient of said function model, solving said function model at a plurality of points on the particular optical function surface from positions in the main scanning direction to thereby produce partial curvatures, and solving an arc function including said partial curvatures from positions in the subscanning direction to thereby produce heights.

21. The method as claimed in claim 20, wherein said corrected configuration calculating step comprises:

a modeling step of approximating the lens-height distribution and the partial curvature distribution in the main scanning direction to a function model while storing a coefficient of said function model, and integrating said function model two times while storing a coefficient of an integrated function model; and a configuration calculating step of solving the function model at a plurality of positions of the particular optical function surface from positions in the main scanning direction to thereby produce heights.

22. The method as claimed in claim 20, wherein said corrected configuration calculating step comprises:

a modeling step of executing numerical integration with a lens height distribution and a partial curvature distribution in a main scanning direction two times, and approximating results of said numerical integration to a function model while storing a coefficient of said function model; and a configuration calculating step of solving said function model at a plurality of points on the particular optical function surface from positions.

23. The method as claimed in claim 1, wherein said corrected configuration calculating step comprises:

a modeling step of approximating the lens height distribution and the partial curvature distribution in the main scanning direction to a function model while storing a coefficient of said function model, and integrating said function model two times while storing a coefficient of an integrated function model; and a configuration calculating step of solving the function model at a plurality of positions of the particular optical function surface from positions in the main scanning direction to thereby produce heights.

24. The method as claimed in claim 1, wherein said corrected configuration calculating step comprises:

a modeling step of executing numerical integration with a lens height distribution and a partial curvature distribution in a main scanning direction two times, and approximating results of said numerical integration to a function model while storing a coefficient of said function model; and a configuration calculating step of solving said function model at a plurality of points on the particular optical function surface from positions.

* * * * *